United States Patent [19]

Kasubke

[11] Patent Number: 5,085,384
[45] Date of Patent: Feb. 4, 1992

[54] POWER LINE ATTACHMENT SYSTEM

[75] Inventor: Volker Kasubke, Neunkirchen, Fed. Rep. of Germany

[73] Assignee: Hydac Technology GmbH, Sulzbach/Saar, Fed. Rep. of Germany

[21] Appl. No.: 617,034

[22] Filed: Nov. 23, 1990

[30] Foreign Application Priority Data

Nov. 24, 1989 [DE] Fed. Rep. of Germany ....... 3938923

[51] Int. Cl.⁵ .............................................. F16L 3/22
[52] U.S. Cl. .................................... 248/62; 248/68.1; 248/73; 248/74.2
[58] Field of Search .............. 248/68.1, 58, 62, 65, 248/70, 71, 73, 74.1, 74.2, 316.7

[56] References Cited

U.S. PATENT DOCUMENTS

| 2,236,882 | 4/1941 | Vorkauf | 248/68.1 |
| 2,867,681 | 1/1959 | Huehnel | 248/68.1 |
| 3,508,730 | 4/1970 | Knezo, Jr. | 248/74.2 |
| 4,244,544 | 1/1981 | Kornat | 248/74.2 |
| 4,589,618 | 5/1986 | Fournier | 248/68.1 |
| 4,813,639 | 3/1989 | Midkiff | 248/68.1 |
| 4,957,251 | 9/1990 | Hubbard | 248/68.1 |

FOREIGN PATENT DOCUMENTS

| 2345843 | 3/1975 | Fed. Rep. of Germany . | |
| 3037938 | 5/1982 | Fed. Rep. of Germany . | |
| 3610829 | 10/1987 | Fed. Rep. of Germany | 248/62 |
| 1290461 | 3/1962 | France | 248/68.1 |
| 2483563 | 12/1981 | France | 248/74.2 |
| 300125 | 9/1954 | Switzerland | 248/74.1 |
| 1032109 | 6/1966 | United Kingdom | 248/68.1 |
| 1239409 | 7/1971 | United Kingdom | 248/73 |
| 2005758 | 4/1979 | United Kingdom | 248/74.1 |

Primary Examiner—David M. Purol
Assistant Examiner—Robert A. Olson
Attorney, Agent, or Firm—Roylance, Abrams, Berdo & Goodman

[57] ABSTRACT

The attachment system connects power lines on at least one base plate formed of a flexible strip. The base plate has a pattern of holes passing all the way through the base plate. These holes form rows extending at least partially parallel to one another and assuming a predetermined spacing from one another. The attachment system also has attachable/detachable elements on the base plate, each of which has a main body for receiving at least one power line and a first type of pedestal for stationary engagement in the holes. The plastic strips is 0.5 to 5 mm thick. Instead of plastic, the strip can be steel with a 0.1 to 0.5 mm thickness. At least in some of the rows of holes, the sum of the hole dimensions in each such row, under bending stress along each such row, form a definite kink point.

22 Claims, 3 Drawing Sheets

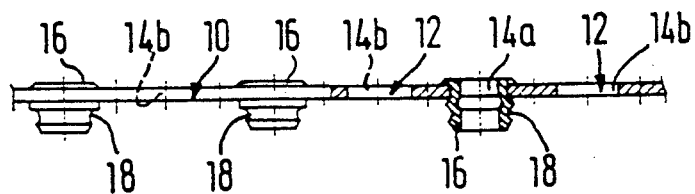
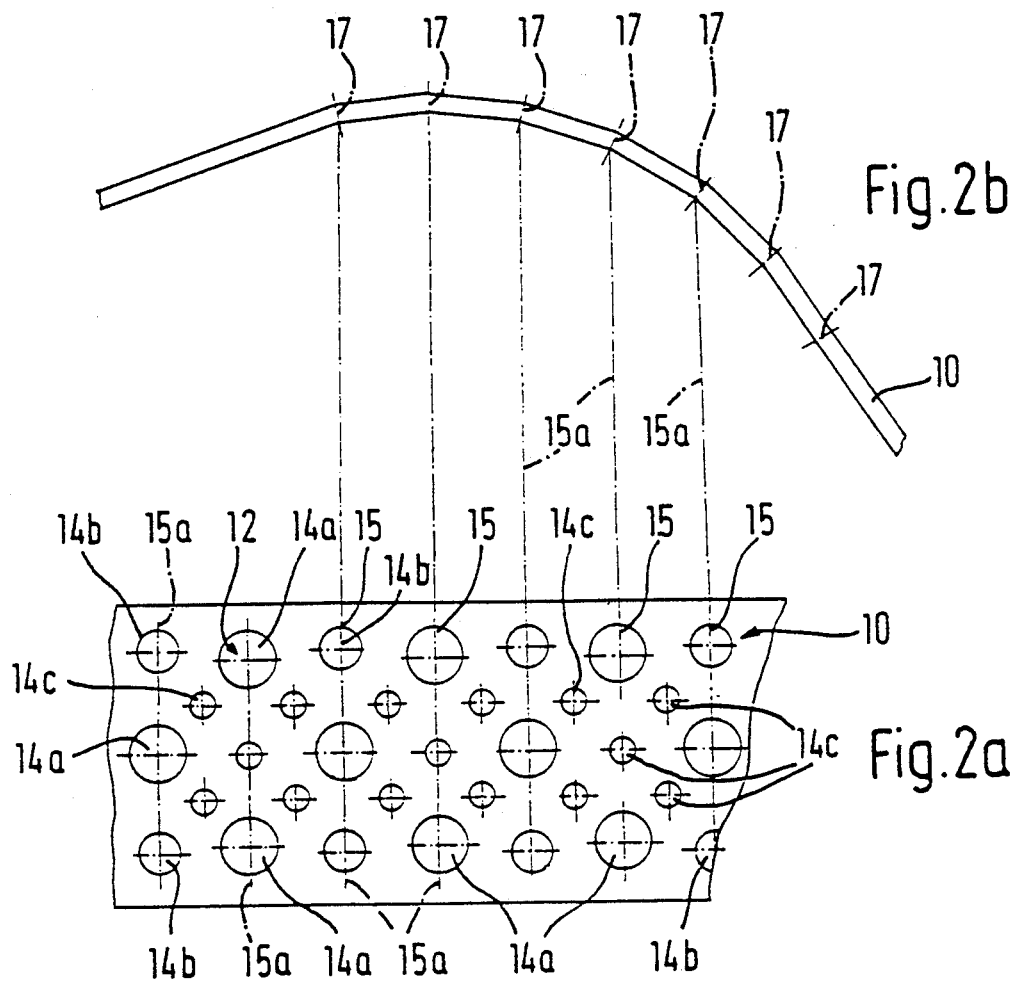
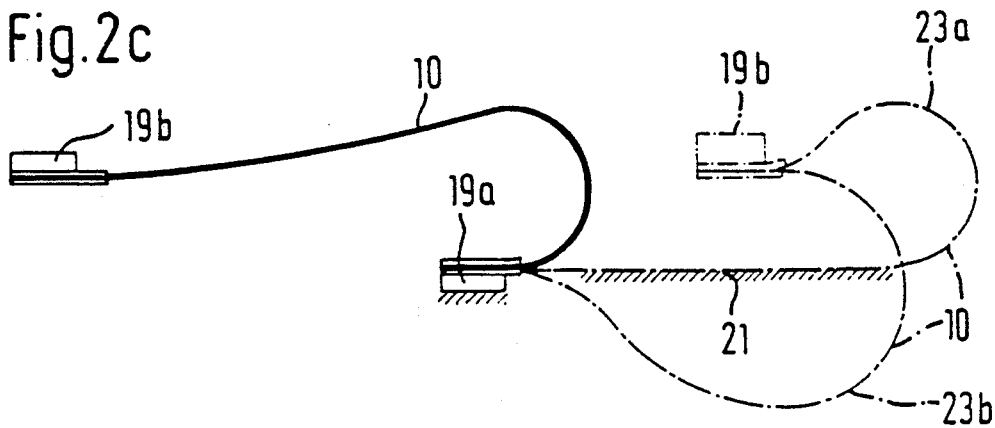

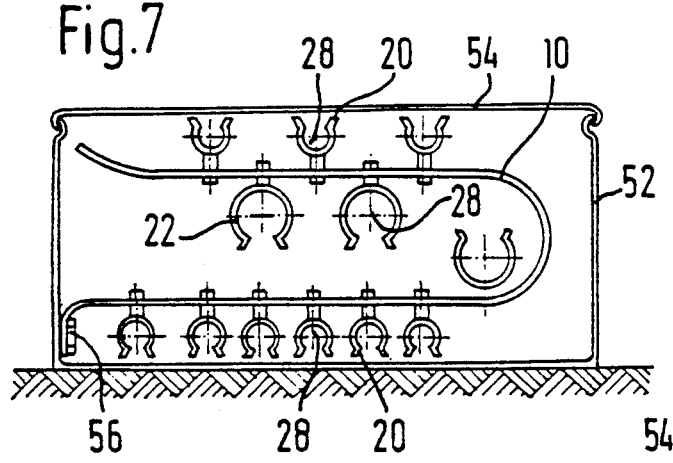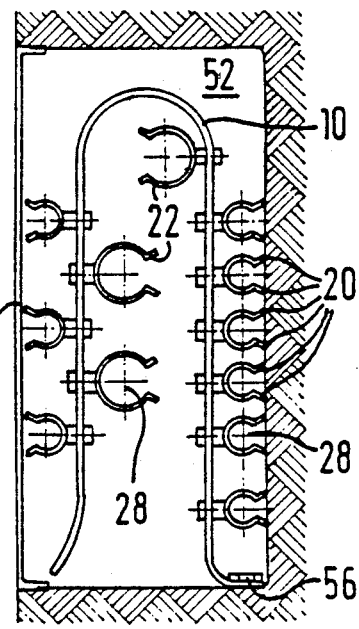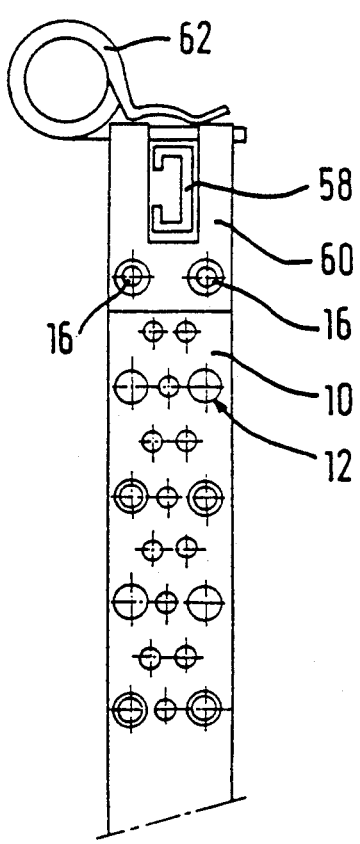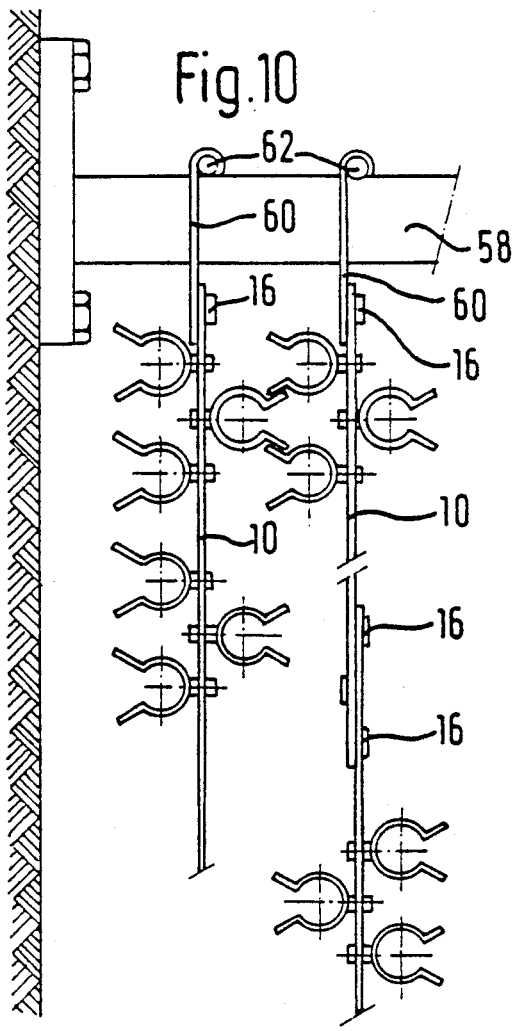

POWER LINE ATTACHMENT SYSTEM

FIELD OF THE INVENTION

The present invention relates to an attachment system for connecting power lines to at least one base plate formed of a flexible plastic or steel strip. The base plate has a hole pattern with openings passing all the way through it and arranged in rows or series of holes extending at least partially parallel to one another at a predetermined spacing from one another. Elements can be attached to and detached from the base plate. Each element has main body part for receiving at least one power line and a pedestal for providing a stationary and secure fit in one of the holes.

BACKGROUND OF THE INVENTION

An attachment system is know from German Offenlegungsschrift 30 37 938. This system relates to a prefabricated structural element for liquid surface heating, and has a double layer construction comprising a flexible strip of foil. Strips of foam material are fastened to the strip of foil and lie transverse to the longitudinal axis of the strip of foil and parallel to one another. The width and spacing of the foam strips is determined so that the structural element can be rolled into a bundle.

This structural element is of relatively light structure and can be transported in a small space when rolled into a ball. Because of its construction, the structural element is approximately 20 to 35 mm in thickness and is subject to no bending stresses whatsoever.

Attachable/detachable elements which can be used for the attachment system according to the present invention are disclosed in German Offenlegungsschrift 23 45 843. This document also discloses a base plate in the form of a carrier having sheathing extending lengthwise to receive the pedestal of an element for attaching and detaching the element from it. This known carrier is not provided for and is not suitable for resistance to bending stresses. The danger of shearing exists both in the sheathing and in the pedestal to and from which it can be attached and detached.

SUMMARY OF THE INVENTION

An object of the present invention is to provide a system for attaching power lines which can be attached and detached in various ways and which can be subjected to frequently changing and high bending stresses without the danger of being damaged.

The object is obtained by a system for attaching power lines, comprising at least one base plate formed of a flexible strip with a thickness between about 0.1 mm and about 5.0 mm. A hole pattern is formed in the base plate of holes passing completely through the base plate. The pattern has rows of the holes extending at least partially parallel to one another at a predetermined spacing. The holes of at least some of the rows have dimensions to form definite kink points or lines under bending stress thereat. First elements are detachably coupled to said base plate. The first elements have main body means for receiving and retaining power lines and pedestal means for engaging the first elements in said holes.

The attachment system according to the present invention includes a base plate having a material cross section transverse to the direction of the effective bending stress which is diminished by rows of perforations or holes. The attachable and detachable elements for guiding the power lines are located in those holes so that kink points occur there. Under the effect of the bending stress, the flexible strip then generally forms a polygon. The number of angles formed by the kink points can be defined by a predetermined number of perforations or holes.

It is surprising that despite the reduction of the material dimensions by means of the rows of perforations or holes which lead to kink points in the strip and despite the effect of bend stresses, a strip of the present invention has a longer life than strips with irregular patterns of perforations or holes.

In one particularly preferred embodiment, the perforation or hole pattern has at least two types of perforations or holes with different diameters. This permits attachment and detachment of different sizes of elements on the base plate, thereby increasing the possibilities of use of the attachment system according to the present invention, particularly when power lines of the greatest range of diameters are to be guided and fastened to the base plate.

Advantageously, the sum of the hole diameters of at least some of the rows of perforations or holes is greater than the dimensions of the other rows. At least some of the rows of perforations or holes have perforations or holes of at least two types, providing the greatest possible number of different attachment possibilities in the smallest space.

By using a pattern of perforations or holes in the base plate, a variety of perforations or holes passing all the way through are present in the smallest possible space. The attachable/detachable elements can then be inserted as desired for fixing the power lines to the individual base plate. A variety of attachment possibilities is attained by this means, and concurrent with this a high degree of flexibility of the attachment system is attained. Additionally the attachable/detachable elements can be fixed to the border of the base plate in an advantageous manner, which also increases the possibilities of use of the attachment system.

In another preferred embodiment of the present invention, the attachable/detachable elements are clamps and/or spacers configured as snap attachment members. These snap members can be connected in an especially simple manner with the base plate and also can be disconnected, so that the attachment system according to the invention can be easily assembled and adapted to different structural conditions.

In one especially preferred embodiment of the attachment system according to the present invention, spacers are inserted into the perforations or holes of the base plate and project on one side of the base plate for a certain distance from the base plate, which distance is greater than the distance of projection of the relevant element pedestals on the same side of the base plate. In this manner, the spacers guarantee a uniform distance between the base plate and, for example, some stationary part, such as a side wall or a bottom floor on which the base plate can be mounted. The clamps can then be connected with the base plate without coming into contact with the stationary part which could hinder or even prohibit the seating of the clamps configured as snap-on parts.

The spacers preferably are hollow and cylindrical. Each spacer end area has a circumferential annular groove for engagement with the base plate. With the two annular grooves in each spacer, two base plates can be connected with each other or one base plate can be connected with a different part or a stationary part. Preferably, a connecting element is provided for that purpose, and extends through the relevant spacer.

In one further particularly preferred embodiment of the attachment system, the attachable/detachable element is formed of a cable channel or cable channel segment in which the power lines can be guided. Preferably, the cable channel or segment has an outwardly closed peripheral surface and an inner partition or network system. By means of this attachment element, individual power lines, as well as a composite of such conductors, can be protected from outside influences on the base plate. The internal arrangements allow for precise arrangement of individual conductors and strands of conductors within the attachment element. Furthermore, this internal arrangement can be configured as a buffer member, so that these protective members are worn out by use and the conductors running in them are preserved, insofar as friction points occur between the inner arrangement and the conductor material in the case of changing bending stress.

It especially advantageous to produce the base plate by an extrusion process, preferably from polyamide 6. It is a low-cost process. Perforations or holes can be stamped or punched in the plastic base plate. The attachable/detachable elements can be produced by means of an injection molding process.

For guiding an individual power line, a certain number of attachable/detachable elements can be arranged with their main body parts at a predetermined spacing from one another along a line formed by the relevant power line. A base plate is present supporting this arrangement and associated with the relevant attachable/detachable element. In this manner with the attachment system permits the guidance of a greater number of power lines over longer distances without formation of a so-called "cable salad", even when the individual base plate supplies power to movable machine elements, such as carriage arrangements in machine tools arranged over correspondingly long paths of movement.

In another preferred embodiment, a plurality of base plates are arranged one behind the other and at a predetermined spacing from one another. Preferably, each base plate is in an S-shaped configuration forming loops, and located in a channel-shaped member. By this means, the power lines in cable channels of the traditional type can attain the highest possible density of layout by maintaining such a layout of the power lines.

The individual base plate is preferably held by a holding device at least partially surrounding an arm, and is preferably movable on this arm. This base plate with the power lines attached can be suspend from a track on the arm in a manner similar to a curtain. The power lines suspended in such a manner are then freely movable along the arm.

It is especially advantageous to produce the individual base plates of a certain length in great quantity. This is cost effective. Such modular-type base plates can be connected to produce longer units to be connected with one another.

The attachment system according to the present invention provides a modular unit of plug-together building blocks. The various parts, such as base plates, spacers, clamps and so forth can be purchased as desired or needed, and can be connected with one another in an assembly process.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 1 is a partial side elevational view, partially in section, of a base plate according to the present invention;

FIG. 2a is a partial plan view of the base plate of FIG. 1;

FIG. 2b is a partial side elevational view of the base plate of FIG. 2a configured as a polygon and following the introduction of a bend stress;

FIG. 2c is a side elevational view illustrating possibilities of movement of the base plate with corresponding increased bending;

FIGS. 7 and 8 are side elevational views of the attachment system of the present invention mounted in stationary cable channels; and FIGS. 9 and 10 are a front elevational view and a side elevational view, respectively, of the attachment system according to the present invention suspended on an arm by means of a holding device.

DETAILED DESCRIPTION OF THE INVENTION

Figure 3:
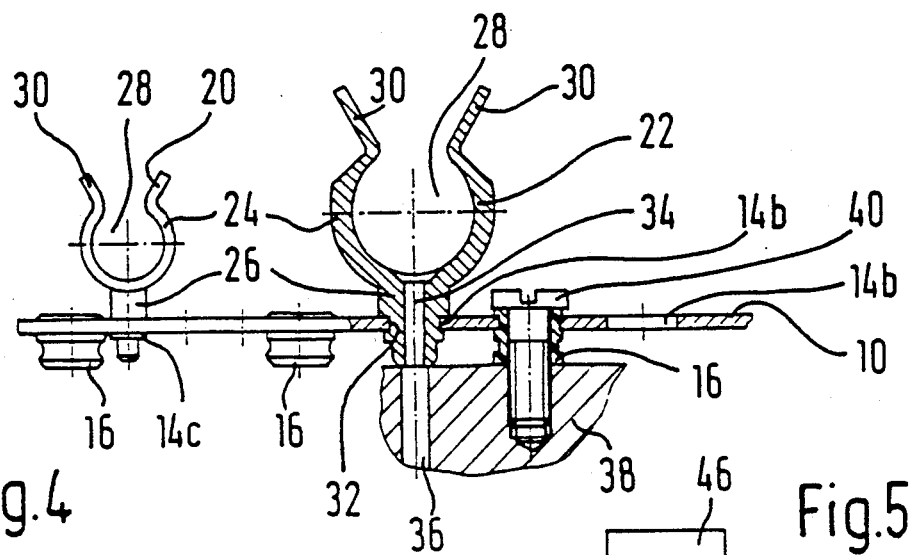
FIG. 3 is a side elevational view of an attachment system, in partial section according to the present invention.

The base plate (reference 10 in its entirety), according to the present invention, is manufactured of a flexible plastic strip, preferably a strip of polyamide 6, and has a thickness of about 0.5 mm to about 5.0 mm, and preferably approximately 1 to 2 mm (FIG. 1). The plastic strip is flat when not subjected to bending stresses. It can be manufactured as a continuous strip by an extrusion process and can be subdivided into predetermined desired lengths as required.

As shown particularly in FIG. 2a, base plate 10 has a perforation or hole pattern indicated in its entirety as 12. The circular perforations or holes pass all the way through and can be punched into base plate 10 with suitable tools. The perforations or holes can also be drilled out. In the exemplary embodiment shown, three sets of perforations or holes 14a, 14b and 14c with progressively decreasing perforation or hole cross sections are present in this pattern, in the form of perforations or holes with different diameters.

Perforations or holes 14a to 14c form rows extending at least partially parallel to one another and assume a predetermined spacing from one another. In the case of one part of this series of perforations or holes, their perforation or hole midpoints line along imaginary lines 15a oriented perpendicular to the longitudinal axis of base plate 10. The sum of respective perforation or hole dimensions, in this case the diameters, is apportioned so that under the effect of a bending stress along line 15a of each row 15 of perforations or holes, the strip in turn forms a definite kink point or line 17, shown in FIG. 2b.

The introduction of such bending stresses can occur, for instance, with an arrangement such as is shown in FIG. 2c, when flexible base plate 10 is stretched between two machine parts 19a and 19b. Machine part 19a remains stationary, while the other machine part 19b is movable along the path of movement shown in FIG. 2c from left to right, as shown in dot-dash lines. Such arrangements are employed, among other things, in machine carriages. To supply movable machine part 19b with power in the form of hydraulic and/or electrical power, base plate 10 serves as supply element on which the power lines (not shown) can be mounted by means of attachable/detachable elements.

When machine part 19b in FIG. 2c is moved to the right and a stationary floor 21 is present, base plate 10 is placed on this floor 21 and takes the position shown with 23a in FIG. 2c. Without floor 21, base plate 10 takes position 23b. As a result of this, the type of bend stress depends considerably upon the nature of the use of base plate 10. According to the force of the bend stresses to be expected, the material dimensions of base plate 10 are diminished from 30 to 60%, preferably between 50 and 60%, at the individual predetermined kink points 17, by the relevant rows 15 of perforation or holes. As shown particularly in FIG. 2b, a uniform polygon is produced by kink points 17 around the circumference of the curve of base plate 10 by introduction of a certain degree of bend stress. The number of angles produced by the predetermined rows of perforations or holes is determined by the radius of the curve of base plate 10 at the point of the bend.

The power lines are deleted from FIGS. 1 to 2c for simplicity of viewing. Likewise, FIG. 2b does not show the perforation or hole pattern 2 shown in FIG. 2a. Modification of the number of power lines affixed to base plate 10 can correspondingly influence their bend behavior.

If not of plastic, the strip can also be made of steel. If made of steel, base plate thickness of 0.1 to 0.5 mm is preferable.

The strips being used for an attachment system according to the present invention in the form of base plate 10 are sufficiently rigid to provide a tight hold for the attachable/detachable elements for the guiding and holding of power lines, while being sufficiently flexible that they are still subject to all bend stresses which occur. Included in these stresses are also any bend stresses which have the tendency to subject base plate 10 to torsional forces along its longitudinal axis. The torsional forces lead to twisting and distortion of the base plate along the plane of the plate.

The curve radius of base plate 10 shown in FIG. 2b can also be determined so that the number of kink points 17 can be varied. Thus, especially with a high number of kink pints 17, a curve radius can be attained which is smaller than the otherwise traditional curve radii of base plates which are attained with undefined patterns of perforations.

The rows 15 of perforations or holes forming the kinks extend essentially perpendicular to the longitudinal axis of base plate 10. However, a process can also be used by which the rows of perforations or holes forming the kinks assume any other desired angle between 0° and 90°. relative to the longitudinal axis of the base plate. Accordingly, a different kink arrangement and a different bend rate is obtained. This can be determined, as desired, according to the range of use of the attachment system.

Perforations or holes 14a with the largest diameter in the present exemplary embodiment are provided to receive the spacers 16. As is shown particularly in FIG. 1, in the cross-sectional representation on the right half of the drawing, the individual spacer 16 comprises a hollow cylinder which has within each of its two outer end areas a circumferential annular groove 18. The width of these annular grooves 18 is selected so that base plate 10 can engage or catch in these annular grooves 18. The relevant edge of a perforation or hole 14a can be brought essentially into alignment with the base of each annular groove 18. Spacers 16 project a certain distance from base plate 10.

Perforations or holes 14b and 14c with the middle-sized and smallest diameters receive clamps 20 and 22 of different sizes (FIG. 3). It is reasonable to introduce smaller structure clamps 20 into perforations or holes 14c with the smallest dimensions or diameters, whereupon the larger clamps 22 can be received in the middle-sized perforations 14b. The sizes of the relevant clamps is dependent upon the power lines to be affixed therein.

As shown particularly in FIG. 3, clamps 20, 22 have clamp-like main body parts 24 as well as pedestals 26. Clamp body 24 is essentially C-shaped and has an essentially circular receiving space 28 in which a power line of corresponding configuration can be inserted. Power lines include any type of power, control and/or lubricating conductors, including pneumatic tubes. Furthermore, rod-shaped members or cables can also be fastened to and/or can act as guides on individual base plates 10. For simplification of the introduction of individual power lines (not shown) into the individual receiving spaces 28, the two free ends 30 of each clamp 20, 22 or 46 (FIG. 5) are bent outward to form a type of receptacle. These clamps can be manufactured by an injection molding process, like base plate 10. Forming plastic clamps 20, 22 and 46 with spread apart ends 30 enables the power lines to be pressed into receiving spaces 28, and the clamps to exert clamp pressure on the power lines after the ends return to their original positions affixing the power lines in position in clamps 20, 22 and 46. Pedestal 26 of each clamp 20, 22 has an annular groove 32 similar to annular groove 18 of spacer 16. Groove 18 is adapted to the diameter of the holes in base plate 10 and is arranged to receive the base plate.

Figure 4:
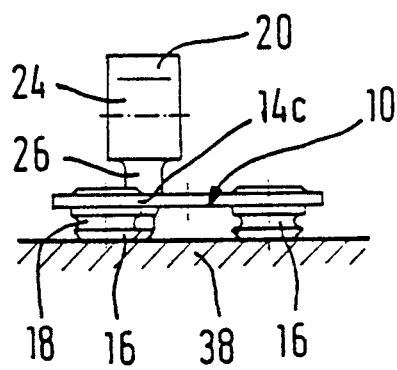
FIGS. 4 and 5 are side elevational views of two different types of clamps snapped onto the base plate according to the present invention.
Figure 5:
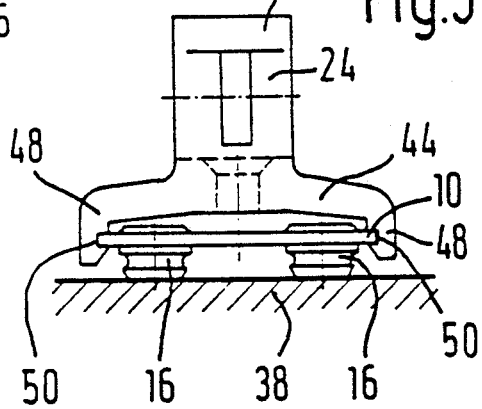

Base plate 10, as is shown in FIG. 1, can have spacers 16 at predetermined spacing to guarantee that base plate 10 assumes a predetermined distance from a stationary member 38, for instance a side or bottom surface. The predetermined distance corresponds to the distance that spacer 16 projects from base plate 10 (FIGS. 4, 5). As shown in FIGS. 4 and 5, this allows clamps 20 and 46 with their first pedestal configuration 26 or their second configuration 44 to be able to catch in holes 14c or on border 50 of base plate 10, respectively, without coming into contact with surfaces of member 38, since the distance pedestals 26 and 44 project form base plate 10 is smaller than that of spacers 16. A minimum distance between the upward projection of spacer 16 and pedestal 26 of clamps 20, 22, as shown particularly in FIG. 3 for clamp 22, need not be provided when pedestal 26 has a through borehole 34. Borehole 34 can be aligned with a borehole 36 of a stationary member 38, for providing a stationary connection between plate 10 and stationary member 38 with clamp 22 by, for instance, a screw connection.

Base plate 10 may also be attached to stationary member 38 (FIG. 3) by a connecting element 40, for instance a screw extending all the way through spacer 16 of hollow cylindrical shape. Instead of using plastic to form spacer 16, a more shock-absorbing material, for instance rubber, can be used. In this way, a vibration-free installation of base plate 10, with its clamps 20, 22 or 46, can be produced. A clamp 20, or 22, with its pedestal 26, could be inserted directly into spacers 16 in place of connecting element 40.

A different type of snap connection is shown in FIG. 5. In FIG. 5, pedestal 44, of the second type of clamp 46, is configured as hook-shaped member with two legs 48. Legs 48 engage border 50 of base plate 10 in a hook-like engagement at two points opposite one another. A screw (not shown) can be provided as a an additional connecting element coupling clamp 46 with base plate 10. The screw can extend through the second type of pedestal 44 of clamp 46 and an adjacent hole with a corresponding hole diameter in base plate 10.

Clamps 20, 22 and 46 and spacers 16 are configured as snap components. In other words, they are selected according to their geometric dimensions and configured especially to be larger than the base plate holes and projections so that they can be elastically and detachably fitted into the holes and projections in base plate 10. The clamps then make a form-locking connection with base plate 10. However, the attachable/detachable elements can also be coupled with base plate 10 by suitable screw connections, which would increase the assembly outlay.

Furthermore, pattern 12 of perforations or holes is not limited to the representation shown in FIGS. 2a and 2c. The pattern can also have different configurations according to the intended purpose. The shape of the perforations or holes of perforation pattern 12 could be determined dependent upon the pedestal of the clamp being used. For instance, the perforations or holes could be rectangular or elliptical. Also, the individual perforation or hole dimensions need not be of uniform diameter in base plate 10, but can, for instance be conical.

Figure 6:
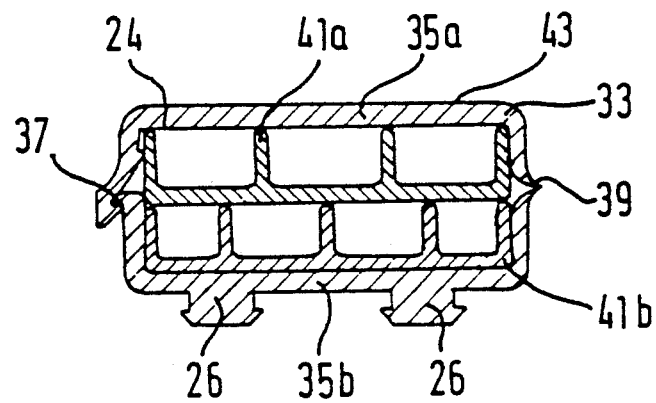
FIG. 6 is a side elevational view, in section, of an attachable/detachable element in the form of a cable channel segment according to the present invention.

FIG. 6 shows another attachable/detachable element, in cross section, in the form of a cable channel segment 33, within which the power lines (not shown) can be guided. Cable channel segment 33 has two pedestals 26 at its bottom, as can be used for both types of clamps 20 and 22. Cable channel segment 33 consists essentially of two halves 35a and 35b connected with one another by snap connection 37. Halves 35a and 35b can be pivoted by a strap hinge 39 serving as an articulation joint. A connection corresponding to snap connection 37 can also be present in the vicinity of and in lieu of strap hinge 39.

Cable channel segment 33 has two inner partitions 41a and 41b forming hollow spaces for receiving the power lines. Inner partitions 41a, 41b can be configured as wear or abrasion members, which become frayed or worn out under friction stress, instead of the power lines which are lying in the channel. If the bearing surfaces of inside partitions 41a, 41b are crowned and the edges which are present are rounded, the power lines will be subjected to even less wear. This could also be the case longitudinally along cable channel segment 33 when it is rounded to avoid kinking of the power lines under bending stresses. Cable channel segment 33 additionally has an outside closed circumferential surface 43 for protection of the power lines.

A plurality of cable channel segments 33, as shown in cross section in FIG. 6, are to be arranged one behind the other in a predetermined spacing from one another along base plate 10 (not shown) for guiding the power lines. Cable channel segments 33 could also be assembled in a compact cable duct (not shown) or could be chained together for this purpose. Insofar as is necessary, a cable channel consisting of one piece (not shown) forming a duct can also be attached to base plate 10. Hereinafter, some of the uses of the attachment system according to the present invention are described in greater detail.

In addition to guiding power lines essentially parallel to the longitudinal axis of base plate 10, other areas of use are also possible. A cable channel 52 of the traditional type is shown in FIGS. 7 and 8, and includes a cover 54 closing the opening of cable channel 52. In FIG. 7, cable channel 52 is guided along a bottom surface of a closed hollow box-like construction. The cable channel is mounted completely in a side wall in FIG. 8. Base plate 10 is introduced into cable channel 52 in a S-shaped loop and is securely connected at one end edge by a screw 56 to the side wall of cable channel 52. The other end edge of base plate 10 is loose. A plurality of small and large clamps 20 and 22 are clipped onto base plate 10. The power lines, such as plastic hoses which carry air and liquid, electric cables, ropes or the like (not shown) are held in clamps 20, 22. The receiving spaces 28 of the clamps extend transverse to the length of base plate 10. These power lines essentially form lines along which clamps of the appropriate type are mounted at predetermined spacing for fixing of power lines on base plates 10 within cable channel 52. The representation shown in FIGS. 7 or 8 then recurs in predetermined spacing within the relevant cable channel 52.

If cover 54 is removed from the relevant cable channel 52, then, because of inherent tension of base plate 10, the base plate springs out of cable channel 52 and has a tendency to unfold and to project outward. This simplifies the accessibility to the power lines, which is important when the power lines are to be changed. With the attachment system of the present invention, a high degree or orderliness is attained within cable channels 52.

In another use according to the present invention, a C-profile arm 58 (FIG. 9) extends essentially horizontal and is securely fastened by screws to a side wall (FIG. 10). Base plates 10 are suspended in a rows one after the other on arm 58, as shown particularly in FIG. 10. Each base plate 10 is held on arm 58 by a rod-like holding device 60. Holding device 60 is connected at one end to base plate 10 by two spacers 16 (FIG. 9). The side wall of holding device 60 at these points has suitable bores which engage one annular groove 18 of each spacer 16. The other annular groove 18 receives base plate 10. At the other end of holding device 60, a set off or bend down portion receives a spring clip 62 (FIG. 9) to affix holding device 60 to arm 58. The connections of holding devices 60 with arms 58 can be designed so that base plates 10 connected with holding devices 60 can move along arms 58. As shown in FIG. 10, it is possible to provide a plurality of base plates 10 arranged one behind the other and connected by spacers 16 to form a series of rows.

The strip of perforations or holes shown in FIG. 2a has the following dimensions in millimeters, with the tolerances indicated:

The strip width is 32 + 0.3.
The thickness of the strip for synthetic resin PA 6, is 1.0 to 2.0, and for sheet steel is 0.2 to 0.4.
The hole diameter of the largest holes 14a is 6.5 + 0.1,
of middle-sized holes 14b is 5.0 + 0.1,
and of smallest holes 14c is 3.5 − 0.1.

The imaginary line 15a of one series or row of holes or perforations along a kink point 17 is at a distance of 10.0 mm from the directly adjacent imaginary line 15a of the next row of holes at the next kink point 17. Three imaginary hole or perforation lines 15a long kink points 17 one after the other line within the tolerance area of 20+0.1 mm. The line running parallel to and between adjacent imaginary hole or perforation lines 15a pass through the midpoints of holes or perforations 14c having the smallest hole diameter and are spaced from the directly adjacent lines 15a by a distance of 5.0 mm. Along an imaginary hole or perforation line 15a lie two holes 14a with the largest diameter with their centers spaced 21.4 mm from each other. The next adjacent line 15a has two holes 14b with the average size diameters with centers also spaced at 21.4 mm from each other. Holes or perforations with the smallest diameters 14c lie along lines extending parallel to lines 15a at 10 mm separation from one another.

While various embodiments have been chosen to illustrate the invention, it will be understood by those skilled in the art that various changes and modifications can be made therein without departing from the scope of the invention as defined in the appended claims.

What is claimed is:

1. A system for attaching power lines, comprising:
   at least one base plate formed of a flexible strip with a thickness between about 0.1 mm and about 5.0 mm, said base plate having longitudinal free edges and being essentially planar in directions transverse to said longitudinal free edges;
   a hole pattern formed in said base plate of holes passing completely through said base plate, said pattern having rows of said holes extending at least partially parallel to one another at a predetermined spacing, said holes of at least some of said rows having dimensions to form definite kink points under bending stress thereat; and
   first elements detachably coupled to said base plate, said first elements having main body means for receiving and retaining power lines and having pedestal means for engaging said first elements in said holes.

2. A system according claim 1 wherein said flexible strip is plastic with a thickness between about 0.5 mm and about 5.0 mm.

3. A system according to claim 1 where in said flexible strip is steel with a thickness between about 0.1 mm and about 0.5 mm.

4. A system according to claim 1 wherein said hole pattern comprises at least two sets of said holes of different dimensions.

5. A system according to claim 1 wherein at least some of said rows have holes with larger total dimensions then other rows.

6. A system according to claim 1 wherein each row of at least some of said rows comprises holes of at least two different dimensions.

7. A system according to claim 1 wherein second elements comprise main body means for receiving and retaining power lines, and pedestal means extending at least partially around said base plate for engaging at least one point on a border of said base plate.

8. A system according to claim 7 wherein said pedestal means of said first and second elements comprise snap-on members.

9. A system according to claim 8 wherein snap-on spacers are engaged in some of said holes of said base plate, and extend from said base plate by distances greater than extensions of said pedestal means of said first and second elements from a same side of said base plate.

10. A system according to claim 9 wherein said spacers are hollow and cylindrical, and comprise circumferential annular grooves in end areas thereof receiving portions of said base plate.

11. A system according to claim 9 wherein a connection element can extend from at least one spacer for connecting said base plate with a stationary member.

12. A system according to claim 1 wherein said main body means comprises channel segments receiving the power lines therein.

13. A system according to claim 12 wherein each said channel segment comprises an outside closed peripheral surface with at least one inside partition.

14. A system according to claim 1 wherein said elements are spaced along a length of said base plate and are aligned for guiding one power line therein.

15. A system according to claim 14 wherein a plurality of said base plates are arranged one behind another and spaced from one another.

16. A system according to claim 15 wherein each said base plates are folded to form loops and are located in channel-shaped members.

17. A system according to claim 14 wherein said base plate is movably supported on an arm by a holding means, said holding means at least partially surrounding said arm.

18. A system according to claim 17 wherein a plurality of said base plates are arranged in rows one behind another on said arm.

19. A system according to claim 18 wherein each said row of base plates are coupled to one another.

20. A system according to claim 1 wherein said base plate does not have longitudinally extending stiffening flanges.

21. A system for attaching power lines, comprising:
   at least one base plate formed of a flexible strip with a thickness between about 0.1 mm and about 5.0 mm;
   a hole pattern formed in said base plate of holes passing completely through said base plate, said pattern having rows of said holes extending at least partially parallel to one another at a predetermined spacing, said hoels of at least some of said rows having dimensions to form definite kink points under bending stress thereat;
   first elements detachably coupled to said base plate, said first elements having first main body means for receiving and retaining power lines and having first pedestal means with snap-on members for engaging said first elements in said holes;

second elements detachably coupled to said base plate, said second elements having second main body means for receiving and retaining power lines, and second pedestal means with snap-on members extending at least partially around said base plate for engaging at least one point on a border of said base plate; and snap-on spacers engaged in some of said holes of said base plate and extending from said base plate by distances greater than extensions of said first and second pedestal means from a same side of said base plate, said spacers being hollow and cylindrical and including circumferential annular grooves in end areas thereof receiving portions of said base plate.

22. A system for attaching power lines, comprising:

a plurality of base plates arranged one behind another and spaced from one another, each said base plate being formed of a flexible strip with a thickness between about 0.1 mm and about 5.0 mm, said base plates being folded to form loops located in channel-shaped members;

a hole pattern formed in each said base plate of holes passing completely through each said base plate, each said pattern having rows of said holes extending at least partially parallel to one another at a predetermined spacing, said holes of at least some of said rows having dimensions to form definite kink points under bending stress thereat; and first elements detachably coupled to each said base plate, said first elements having main body means for receiving and retaining power lines and having pedestal means for engaging said first elements in said holes, said elements being spaced along a length of each said base plate and aligned for guiding one power line therein.

* * * * *